(12) United States Patent
Sakib et al.

(10) Patent No.: US 11,263,309 B2
(45) Date of Patent: Mar. 1, 2022

(54) BLOCK DEVICE SIGNATURE-BASED INTEGRITY PROTECTION FOR CONTAINERIZED APPLICATIONS

(71) Applicant: Microsoft Technology Licensing, LLC, Redmond, WA (US)

(72) Inventors: Md Nazmus Sakib, Seattle, WA (US); Jeffrey A. Sutherland, Seattle, WA (US); Deven Robert Desai, Bellevue, WA (US); Jaskaran Singh Khurana, Bellevue, WA (US); Scott Randall Shell, Bellevue, WA (US); Jessica M. Krynitsky, Manassas, VA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 147 days.

(21) Appl. No.: 16/671,064

(22) Filed: Oct. 31, 2019

(65) Prior Publication Data
US 2021/0133313 A1    May 6, 2021

(51) Int. Cl.
  *G06F 21/00* (2013.01)
  *G06F 21/52* (2013.01)
  *G06F 21/51* (2013.01)

(52) U.S. Cl.
  CPC .............. *G06F 21/52* (2013.01); *G06F 21/51* (2013.01); *G06F 2221/033* (2013.01); *G06F 2221/2101* (2013.01)

(58) Field of Classification Search
  CPC .... G06F 21/52; G06F 21/51; G06F 2221/033; G06F 2221/2101
  See application file for complete search history.

(56) References Cited

U.S. PATENT DOCUMENTS

| 9,811,806 B1 | 11/2017 | Kuang et al. |
| 2010/0175132 A1* | 7/2010 | Zawadowskiy ....... G06F 21/564 726/23 |
| 2018/0046803 A1* | 2/2018 | Li ........................ G06F 11/302 |
| 2018/0349610 A1* | 12/2018 | Gupta .................... G06F 21/57 |

FOREIGN PATENT DOCUMENTS

WO    2013142948 A1    10/2013

OTHER PUBLICATIONS

"International Search Report and Written Opinion Issued in PCT Application No. PCT/US20/056223", dated Jan. 29, 2021, 10 Pages.

* cited by examiner

*Primary Examiner* — Ghazal B Shehni
(74) *Attorney, Agent, or Firm* — Fiala & Weaver P.L.L.C.

(57) ABSTRACT

Integrity verification of a containerized application using a block device signature is described. For example, a container deployed to a host system is signed with a single block device signature. The operating system of the host system implements an integrity policy to verify the integrity of the container when the container is loaded into memory and when its program code executes. During such events, the operating system verifies whether the block device signature is valid. If the block device signature is determined to be valid, the operating system enables the program code to successfully execute. Otherwise, the program code is prevented from being executed. By doing so, certain program code or processes that are not properly signed are prevented from executing, thereby protecting the host system from such processes. Moreover, by using a single block device signature for a container, the enforcement of the integrity policy is greatly simplified.

20 Claims, 12 Drawing Sheets

BLOCK DEVICE SIGNATURE-BASED INTEGRITY PROTECTION FOR CONTAINERIZED APPLICATIONS

BACKGROUND

As containers become a prevalent mechanism for running cloud applications, they also become a higher-value target for attackers. Container runtimes have numerous known vulnerabilities through which an attacker can gain access to the host machine by breaking out of the container. In the case that a malicious privileged user has compromised the container system, they may attempt to run an executable from the container, causing a breakout which enables access of the host machine or kernel. Another threat involves a malicious user somehow gaining access to the host and attempting to execute code with the intention of extracting data or persisting on the host machine. While conventional techniques utilized for container security can notify a user of a malicious attack, such a notification is often too late, because the host machine or kernel is already compromised at the time of notification.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described herein directed to protecting containers from malicious activity.

For instance, in one implementation, the integrity of a containerized application is verified using a block device signature. A container deployed to a host system is signed with a single block device signature. The same block device signature signs all the blocks of the block device (i.e., the container), and therefore, signs all the files of the container is (e.g., application files, dependency files, etc.). The operating system of the host system implements an integrity policy to verify the integrity of the container when the container is loaded into memory and when program code (e.g., the application) of the container executes. During such events, the operating system verifies whether the block device signature is valid. If the block device signature is determined to be valid, the operating system enables the program code to successfully execute. Otherwise, the program code is prevented from being executed.

In another implementation, the integrity policy is updated based on auditing of the containerized application. For instance, a containerized application may be executed while the integrity policy is not enforced. The containerized application is profiled to determine whether certain operations that violate the integrity policy are legitimate or illegitimate. For operations that violate the integrity policy but are deemed legitimate, the integrity policy is updated to allow such operations so that such operations no longer violate the integrity policy.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
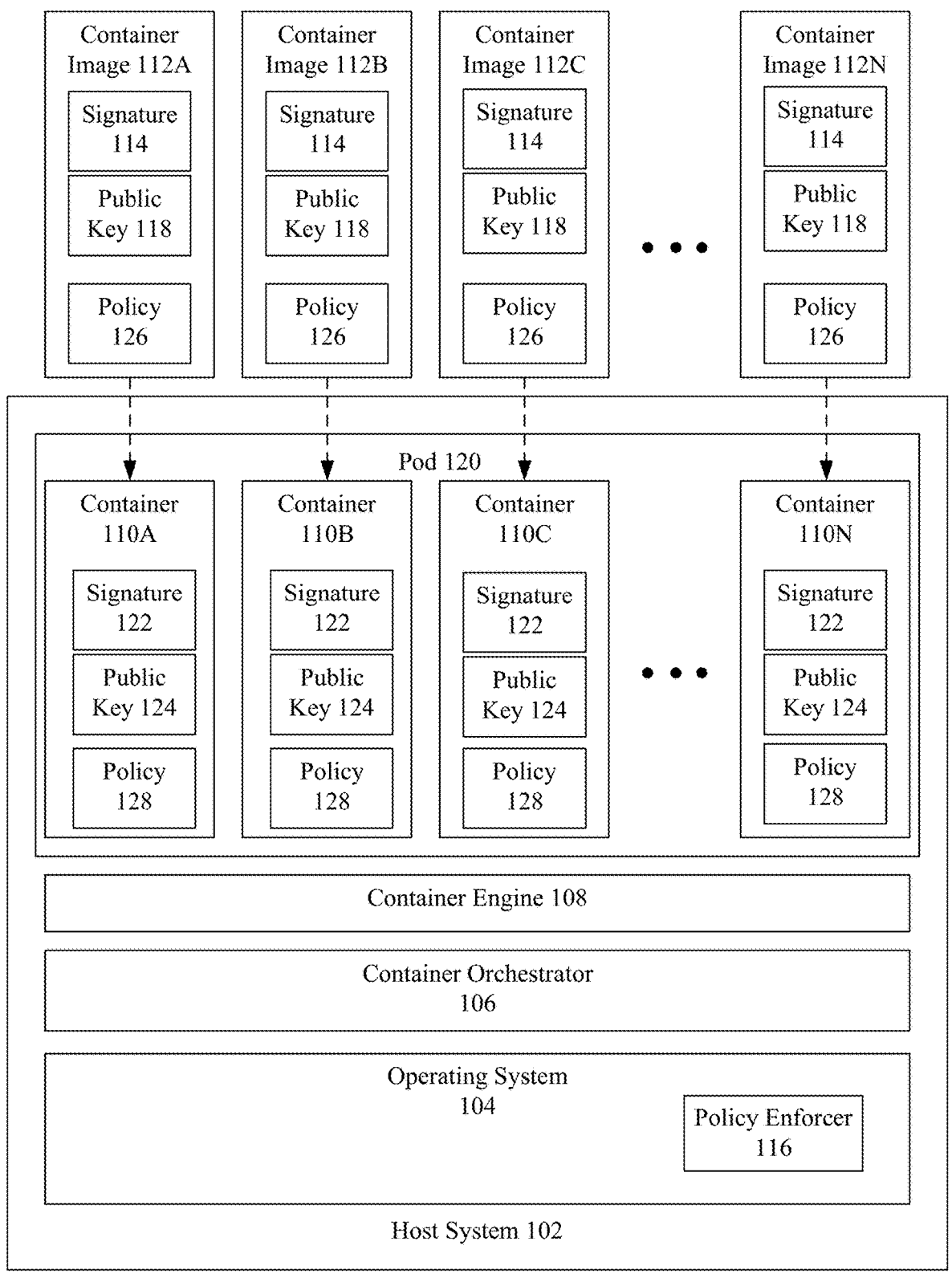
FIG. 1 shows a block diagram of a system configured for hosting and/or executing one or more containers, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments described herein are directed to verifying the integrity of a containerized application using a block device signature. For example, a container deployed to a host system is signed with a single block device signature. The same block device signature signs all the blocks of the block device (i.e., the container), and therefore, signs all the files of the container (e.g., application files, dependency files, etc.). The operating system of the host system implements an integrity policy to verify the integrity of the container when the container is loaded into memory and when program code (e.g., the application) of the container executes. During such events, the operating system verifies whether the block device signature is valid. If the block device signature is determined to be valid, the operating system enables the program code to successfully execute. Otherwise, the program code is prevented from being executed.

By doing so, certain program code or processes (e.g., malicious processes, such as viruses and malware) that are not properly signed are prevented from executing, thereby protecting the host system from such processes. Moreover, by using a single block-level signature for a container, the enforcement of the integrity policy is greatly simplified than compared with alternative solutions that require each file in a container to be individually signed.

Embodiments described herein also are directed to updating the integrity policy based on auditing of the containerized application. For instance, a containerized application may be executed while the integrity policy is not enforced. The containerized application is profiled to determine whether certain operations that violate the integrity policy are legitimate or illegitimate. For operations that violate the integrity policy but are deemed legitimate, the integrity policy is updated to allow such operations so that such operations no longer violate the integrity policy.

A. Block Device Signature-Based Protection for Containerized Applications

FIG. 1 shows a block diagram of a system 100 comprising a host system 102 for hosting and/or executing one or more containers 110A-110N, according to an example embodiment. Host system 102 may comprise a computing device, such as a stationary computing device or a mobile computing device. Examples of stationary computing devices include, but are not limited to, a desktop computer or PC (personal computer), a server, etc. Examples of mobile computing devices include, but are not limited to, a Microsoft® Surface® device, a personal digital assistant (PDA), a laptop computer, a notebook computer, a tablet computer such as an Apple iPad™, a netbook, a smart phone (such as an Apple iPhone, a phone implementing the Google® Android™ operating system, etc.), a wearable computing device (e.g., a head-mounted device including smart glasses such as Google® Glass™, a virtual headset such as Oculus Rift® by Oculus VR, LLC or HoloLens® by Microsoft Corporation, etc.). Host system 102 may also comprise a virtual machine executing on a stationary or mobile computing device. Host system 102 may be implemented into a cloud-based computing environment. For instance, host system 102 may comprise a network-accessible server (i.e., a node) of a network-accessible server set or a virtual machine executing thereon. The network-accessible server set may be co-located (e.g., housed in one or more nearby buildings with associated components such as backup power supplies, redundant data communications, environmental controls, etc.) to form a datacenter, or may be arranged in other manners. Accordingly, in an embodiment, the network-accessible server set may be a datacenter in a distributed collection of datacenters.

As shown in FIG. 1, host system 102 may comprise an operating system 104, container orchestrator 106, a container engine 108 and one or more container(s) 110A-110N. Operating system 104 may manage one or more hardware components (e.g., processor(s), main memory, secondary storage device(s), etc.) and software executing in host system 102. Example hardware components of host system 102 are described in detail below in reference to FIG. 12. Operating system 104 may comprise one or more components that perform certain tasks relating to the execution of software (e.g., container orchestrator 106, container engine 108, and/or container(s) 110A-110N in host system 102. Examples of operating system 104 include, but are not limited to, MICROSOFT® WINDOWS® Operating System (OS), published by Microsoft Corporation of Redmond, Wash., Apple macOS®, Google Android™, LINUX®, or other UNIX® variants. Each of container(s) 110A-110N, container engine 108, container orchestrator 106, operating system 104, and policy enforcer 116 may be stored and/or executed within a memory (not shown) of host system 102.

Container orchestrator 106 may be configured to automate deployment, scaling and availability of applications running in container(s) 110A-110N. For instance, in an embodiment in which host system 102 is implemented into a cloud-based computing environment, container orchestrator 106 may determine when to deploy container(s) 110A-110N to container engine 108 executing on a particular one or more nodes. Container orchestrator 106 may also manage other components executing in host system 102, such as container engine 108. Container orchestrator 106 may wrap container(s) that share the same computing resources and/or networks into a higher-level structure (e.g., pod 120). For example, as shown in FIG. 1, container(s) 110A-110N are wrapped into pod 120. An example of container orchestrator 106 includes, but is not limited to, Kubernetes®, published by Google® Inc.

Container engine 108 may be configured host and/or execute containerized applications, such as container(s) 110A-110N, that are deployed thereto via container orchestrator 106. Container(s) 110A-110N may be created based on corresponding container image(s) (or binary(ies)) 112A-112N, which are provided to host system 102. Container image(s) 112A-112N may be provided to host system 102 by end-users that develop containerized applications and/or developers that develop containerized applications for end-users. In the latter case, the container image(s) may be stored in a code repository and may be accessible to end-users. An example of container engine 108 includes, but is not limited to Docker®, published by Docker®, Inc.

Each of container(s) 110A-110N is a standard unit of executable software that packages program code of an application and all its dependencies necessary for application execution so that the application runs quickly and reliably from one computing environment (e.g., host system 102) to another. Examples of dependencies include, but are not limited to, system tools, system libraries and settings, runtimes, etc. Container image(s) 112A-112N are mapped into memory as corresponding container(s) 110A-110N at runtime when executed by container engine 108. An application running in a container of container(s) 110A-110N is isolated from the rest of host system 102 and from other containers of container(s) 110A-110N. Container(s) 110A-110N share operating system 104 installed in host system 102 and execute as resource-isolated processes, ensuring quick, reliable, and consistent deployments, regardless of environment.

Each of container image(s) 112A-112N may be digitally signed by a signature 114 to confirm its author/publisher and guarantee that the code has not been altered or corrupted since was signed. For instance, each of container image(s) 112A-112N may be deployed with a signature file (shown as signature 114) that comprises a block device signature. A block is a readable and/or writable data block. The data block has a fixed-size (e.g., 4k or multiples thereof). Devices that support reading and/or writing in fixed-size block are referred to as block devices (e.g., USB storage devices (e.g., thumb drives, external hard drives, etc.), hard disk drives, solid state drives, etc.). Each of container(s) 110A-110N also support the reading and/or writing in fixed-size blocks and may be referred to as virtual block devices.

To apply a block device signature (i.e., signature 114) to a container image (e.g., container image 112A-112N, a hash tree signing mechanism may be utilized that applies a hash for every block comprised therein (e.g., an SHA256 hash). Each of the hash values are stored in a tree of pages. A change in a single child block in the tree results in a change of the top-level root hash. As such, only the top-level root hash must be trusted to verify the rest of the tree. A modification to any of the blocks would be equivalent to breaking the hash. Accordingly, a single signature 114 is associated with all the contents (or files) (i.e., the application and its dependencies) of a corresponding container of container(s) 110A-110N such that only a single signature 112 is required to verify the integrity of the corresponding container. In accordance with an embodiment, each of signatures 112 is a dm (device mapper)-verity or a fs (file system)-verity signature. Each of container(s) 110A-110N also comprises an unchangeable public key 118, which is used to verify signature 114 and confirm that container(s) 110A-110N are protected and unchanged.

As further shown in FIG. 1, operating system 104 may comprise a policy enforcer 116. Policy enforcer 116 may be configured to verify the integrity of each of container(s) 110A-110N mapped into memory and determine whether each of container(s) 110A-110N complies with an integrity policy. For example, policy enforcer 116 may determine whether each of container(s) 110A-110B is associated with a signature file (i.e., signature 122) that comprises a block-level signature. Signature 122 represents signature 114 that has been mapped into memory. If no such file or signature exists, policy enforcer 116 may prevent a container from executing. If such a file and signature exist, policy enforcer 116 may be configured to verify the integrity of each of container(s) 110A-110N by determining whether signature 122 is valid based on public key 124. Public key 124 represents public key 118 that has been mapped into memory. For instance, policy enforcer 116 may calculate a hash of a container of container(s) 112A-112N, decrypt the corresponding signature 122 to obtain the top-level root hash using the corresponding public key 124 and compare the calculated hash value with the top-level root hash. If the hash values are the same, then policy enforcer 116 determines that the container has not been altered.

Policy enforcer 116 may be configured to perform the foregoing check at the time container image(s) 112A-112N are loaded into memory (e.g., when the file system for the corresponding container of container(s) 110A-110N is mounted for usage by operating system 104). If the calculated hash matches the top-level root hash, then container(s) 110A-110N are monitored for the initiation of execution of the application and/or file access operations performed by the application for compliance with the integrity policy. If the hash values do not match, then container(s) 110A-110N are unloaded from memory (e.g., the file system is unmounted).

Policy enforcer 116 may also perform the foregoing integrity check when initiation of application execution (and/or processes of the application) and file access operations performed by the application are detected. For example, policy enforcer 116 may be configured to hook function calls performed by container(s) 110A-110N (and/or the application included therein) that initiate execution of code thereof and/or perform file access operations (e.g., read, write, open, etc.). An example of a function call that initiates execution of code includes, but is not limited to, is execve( ). Upon hooking such a function, policy enforcer 116 calculates the hash of the container making the call and compares it to the top-level root hash of the container. If the calculated hash matches the top-level root hash, then policy enforcer 116 enables the function call to complete, thereby enabling execution of the application (or process thereof). If the hash values do not match, then the function call is not enabled to complete, thereby preventing execution of the application (or process thereof). When monitoring file access operations, policy enforcer 116 may hook function calls that perform file access operations (e.g., open( )). Upon hooking such a function call, policy enforcer 116 calculates the hash of the file being accessed and compares it to the top-level root hash of the container. If the calculated hash matches the top-level root hash, then policy enforcer 116 enables the function call to complete, thereby enabling the file access operation to complete. If the hash values do not match, then the function call is not enabled to complete, thereby preventing the file access operation from occurring.

As further shown in FIG. 1, each of container image(s) 112A-112N may further comprise an integrity policy 126, and each of container(s) 110A-110N may further comprise an integrity policy 128, which represents integrity policy 126 that has been mapped into memory. Integrity policy 126 and integrity policy 128 may specify rules that define the signature type to be used for signing the corresponding container (i.e., block device signatures) and/or legal file access operations. For example, the rules may specify a listing of directories and/or files of the corresponding container application's file system that may be opened, read and/or written to via file access operations of the container application. Policy enforcer 116 may implement the rules specified by integrity policy 128 to determine whether container(s) 110A-110N comply with integrity policy 128. Policy enforcer 116 may determine that container(s) 110A-110N do not comply with integrity policy 128 if container(s) 110A-110N are not signed by the signature defined by integrity policy 128 and/or by detecting file access operations that do not conform with the file access operation rules of integrity policy 128. Any file access operations that violate a rule of integrity policy 128 may be logged and/or blocked from being performed.

It is noted that while the foregoing techniques describe that container(s) 110A-110N are associated with a block device signature, it is noted that other components executing on host system 102 may also comprise a block device signature. For example, container orchestrator 106 and container engine 108 may each comprise a respective block device signature that is verified by policy enforcer 116 at the time such components are loaded into memory.

It is further noted that in certain scenarios, each of container image(s) 112A-112N and containers 110A-110N may not comprise a respective policy 126 and policy 128. In such scenarios, policy enforcer 116 may maintain and/or enforce a single (and/or default) integrity policy (not shown) for each of container(s) 110A-110N. That is, the same integrity policy is enforced by policy enforcer 116 for all container(s) 110A-110N of host system 102. Such a policy may be updated and/or refined based on an auditing of container(s) 110A-110N as will be described below with reference to Subsection B.

Figure 2:
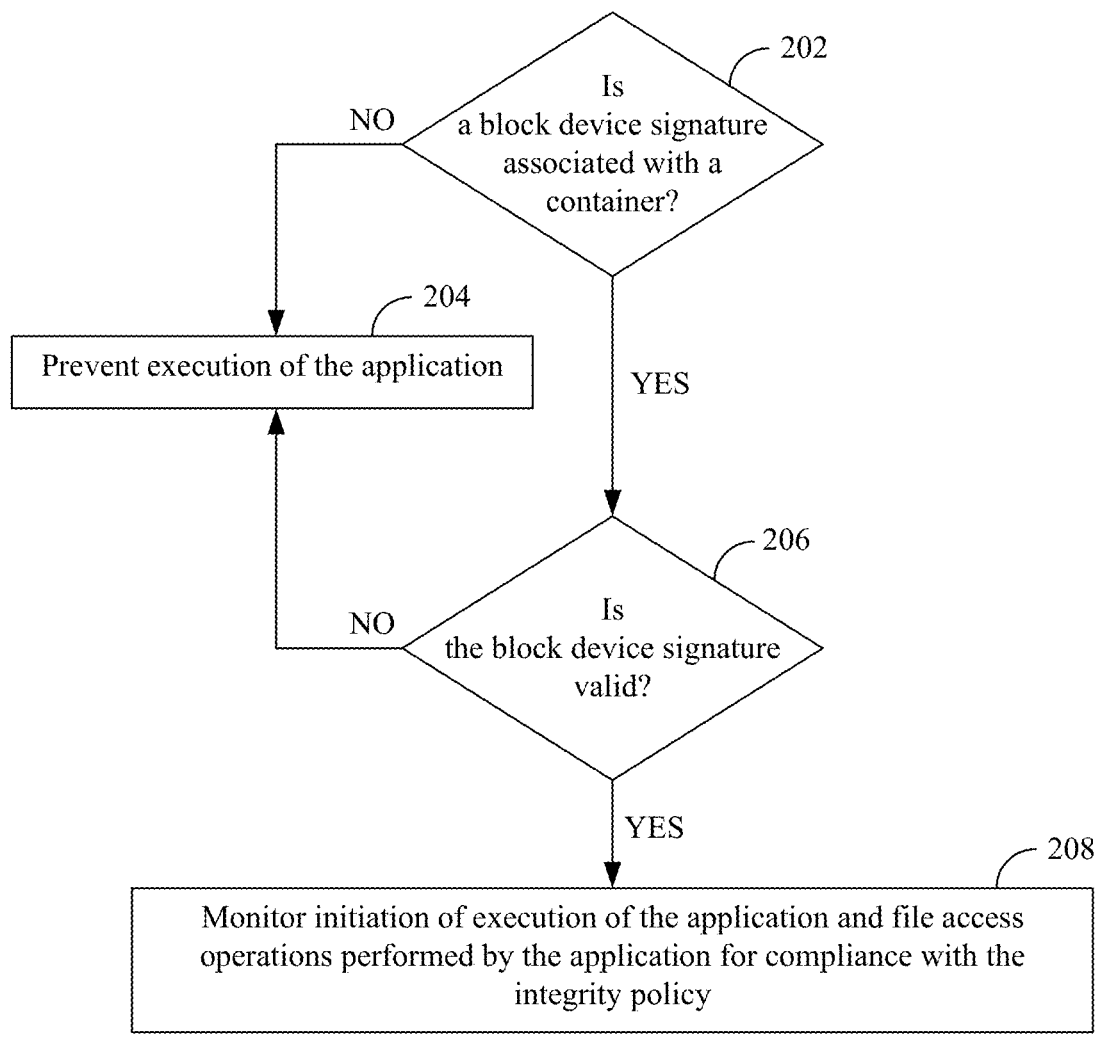
FIG. 2 shows a flowchart of a method for enforcing an integrity policy for a container managed by the operating system, according to an example embodiment.
Figure 3:
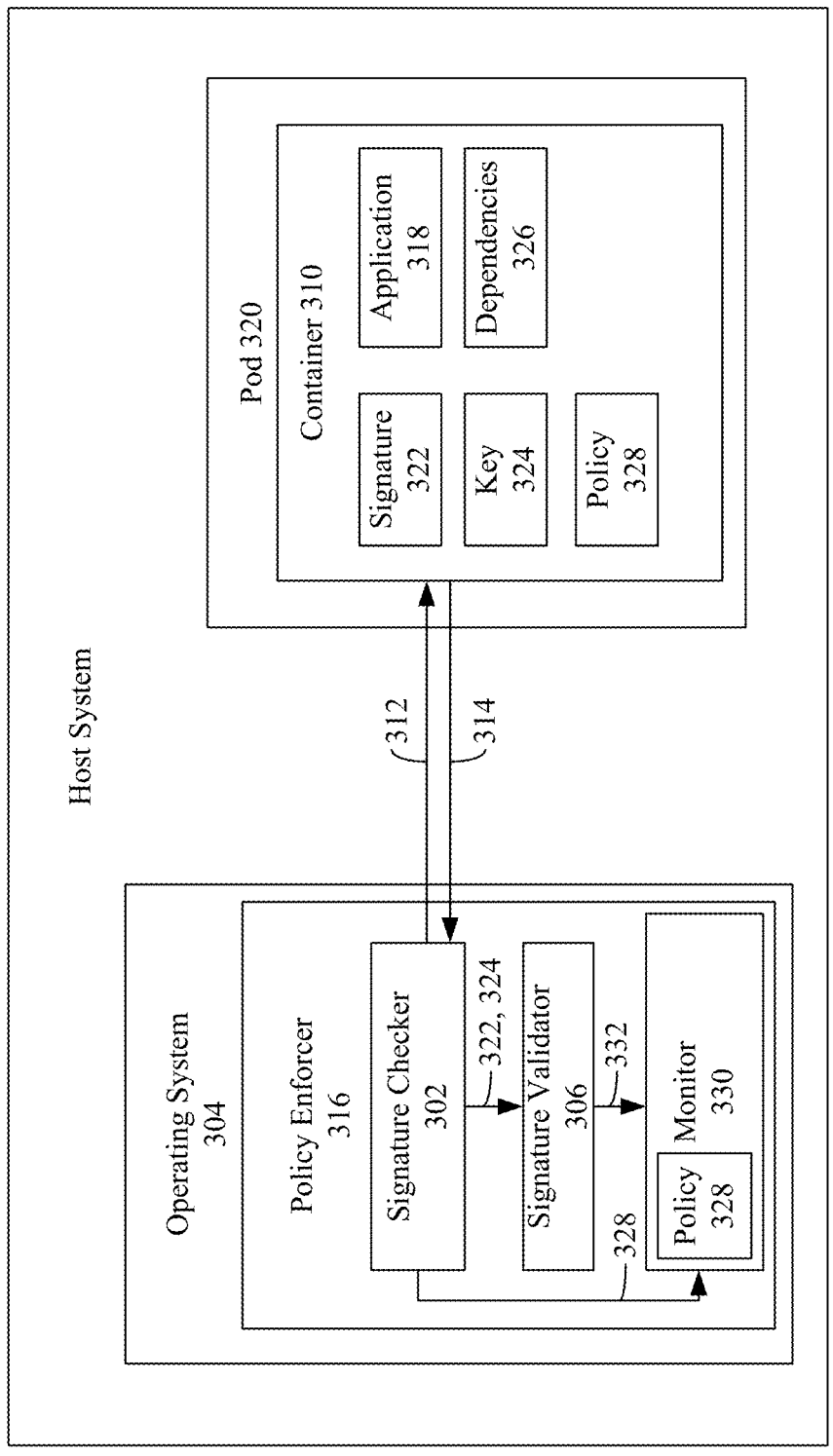
FIG. 3 is a block diagram of a host system configured to enforce an integrity policy for a container managed by an operating system, according to an example embodiment.

Accordingly, an integrity policy may be utilized to protect a host system utilized for container execution in many ways. FIG. 2 shows a flowchart 200 of a method for enforcing an integrity policy for a container managed by the operating system, according to an example embodiment. In an embodiment, flowchart 200 may be implemented by an operating system, such as by a policy enforcer 316 of operating system 304, as shown in FIG. 3. FIG. 3 is a block diagram of a host system 300 configured to enforce an integrity policy 328 for a container 310 managed by operating system 304, according to an example embodiment. As shown in FIG. 3, host system 300 includes operating system 304 and a pod 320. Operating system 304 comprises policy enforcer 316, and pod 320 may comprise one or more containers (e.g., container 310). Container 310 comprises an application 318, application dependencies 326, a signature file 322, a public key 324, and integrity policy 328. Host system 300, operating system 304, policy enforcer 316, pod 320, container 310, signature file 322, public key 324, and integrity policy 328 are examples of host system 102, operating system 104, policy enforcer 116, pod 120, container 110, signature file 122, public key 124, and integrity policy 128, as described above with reference to FIG. 1. As also shown in FIG. 3, policy enforcer 316 comprises a signature checker 302, a signature validator 306, and a monitor 330. Other structural and operational embodiments will be apparent to persons skilled in the relevant art(s) based on the following discussion regarding flowchart 200 and host system 300 of FIG. 3.

Flowchart 200 of FIG. 2 begins with step 202. In step 202, a determination is made as to whether a block device signature is associated with a container that packages an application and dependencies that enable the application to execute, the block device signature also associated with the application and the dependencies as a result of being associated with the container. If a determination is made that the block device signature is not associated with the container, then flowchart 200 continues to step 204. Otherwise, flowchart 200 continues to step 206. For instance, as shown in FIG. 3, signature checker 302 may determine whether a block device signature (e.g., signature 322) is associated with container 310 that packages application 318 and its dependencies 326. For example, signature checker 302 may provide a request 312 to container 310. Responsive to receiving request 312, container 310 may provide a response 314 to signature checker 302 that comprises signature file 322, public key 324 and/or integrity policy 328. Signature checker 302 may determine whether signature file 322 includes a block device signature (in accordance with integrity policy 328). If signature file 322 does not include a block device signature, if response 314 indicates that no signature file 322 exists, or if container 310 does not provide response 314, signature checker 302 may determine that a block device signature is not associated with container 310, and flowchart 200 continues to step 204. If signature file 322 includes a block device signature, signature checker 324 may determine that signature file 322 includes a block device signature and provides signature file 322 and public key 324 to signature validator and provides integrity policy 328 to monitor 330. Flowchart 200 then continues to step 206.

In accordance with one or more embodiments, the block device signature is a hash tree-based signature. In accordance with one or more embodiments, the hash-tree signature comprises at least one of a dm-verity signature or an fs-verity signature. In other embodiments, other types of signatures may be used.

In step 204, execution of the application of the container is prevented. For example, with reference to FIG. 3, policy enforcer 316 prevents application 318 from executing, for example, by unloading container 310 from memory (i.e., memory of host system 300).

In step 206, a determination is made as to whether the block device signature is valid. In response to determining that the block device signature is invalid, flowchart 200 continues to step 204. Otherwise, flowchart 200 continues to step 208. For example, with reference to FIG. 3, signature validator 306 determines whether the block device signature is valid. For example, signature validator 306 may calculate a hash of container 310, decrypt signature of signature file 322 to obtain the top-level root hash using public key 324, and compare the calculated hash value with the top-level root hash. If the hash values are the same, then signature validator 306 determines that the block device signature is valid and provides an indicator 332 to monitor 330 that indicates that the block device signature is valid. Flowchart 200 then continues to step 208. Otherwise, flowchart 200 continues to step 204. Additional details regarding determining whether a block-valid signature is valid is described below with reference to FIGS. 6-9.

In step 208, initiation of execution of the application and file access operations performed by the application are monitored for compliance with the integrity policy. For example, with reference to FIG. 3, responsive to receiving indicator 332, monitor 330 may monitor initiation of execution of application 318 and file access operations performed by application 318 for compliance with integrity policy 328.

Figure 4:
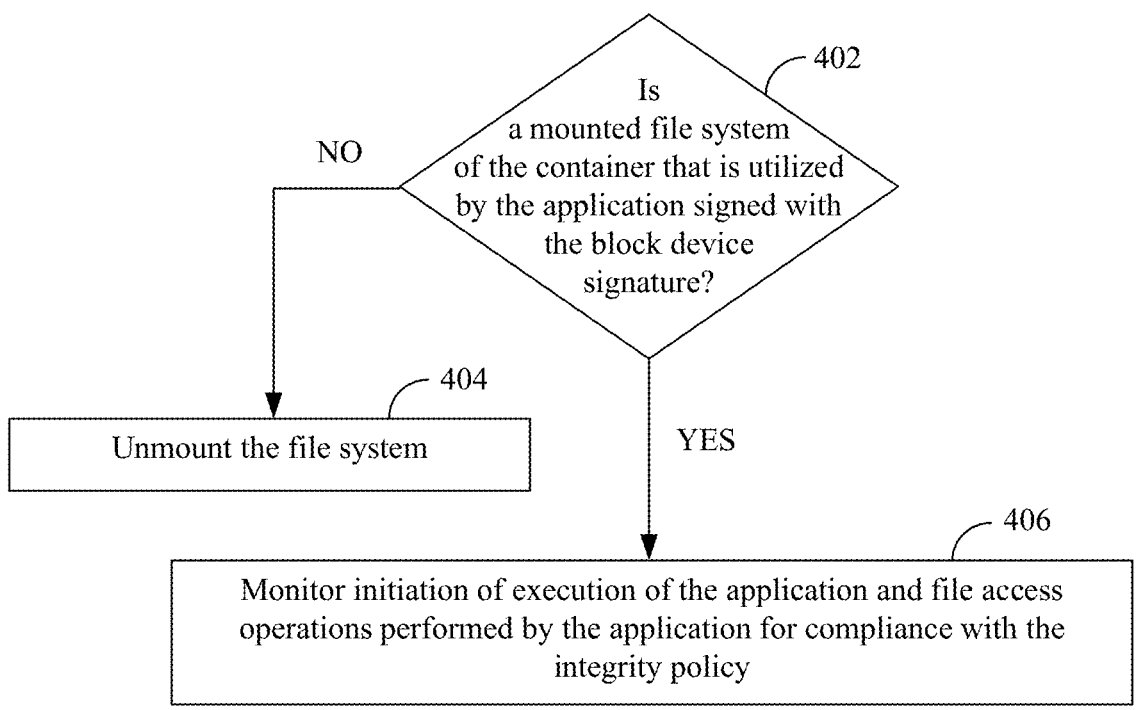
FIG. 4 shows a flowchart of a method for determining whether a block device signature is associated with a container, according to an example embodiment.
Figure 5:
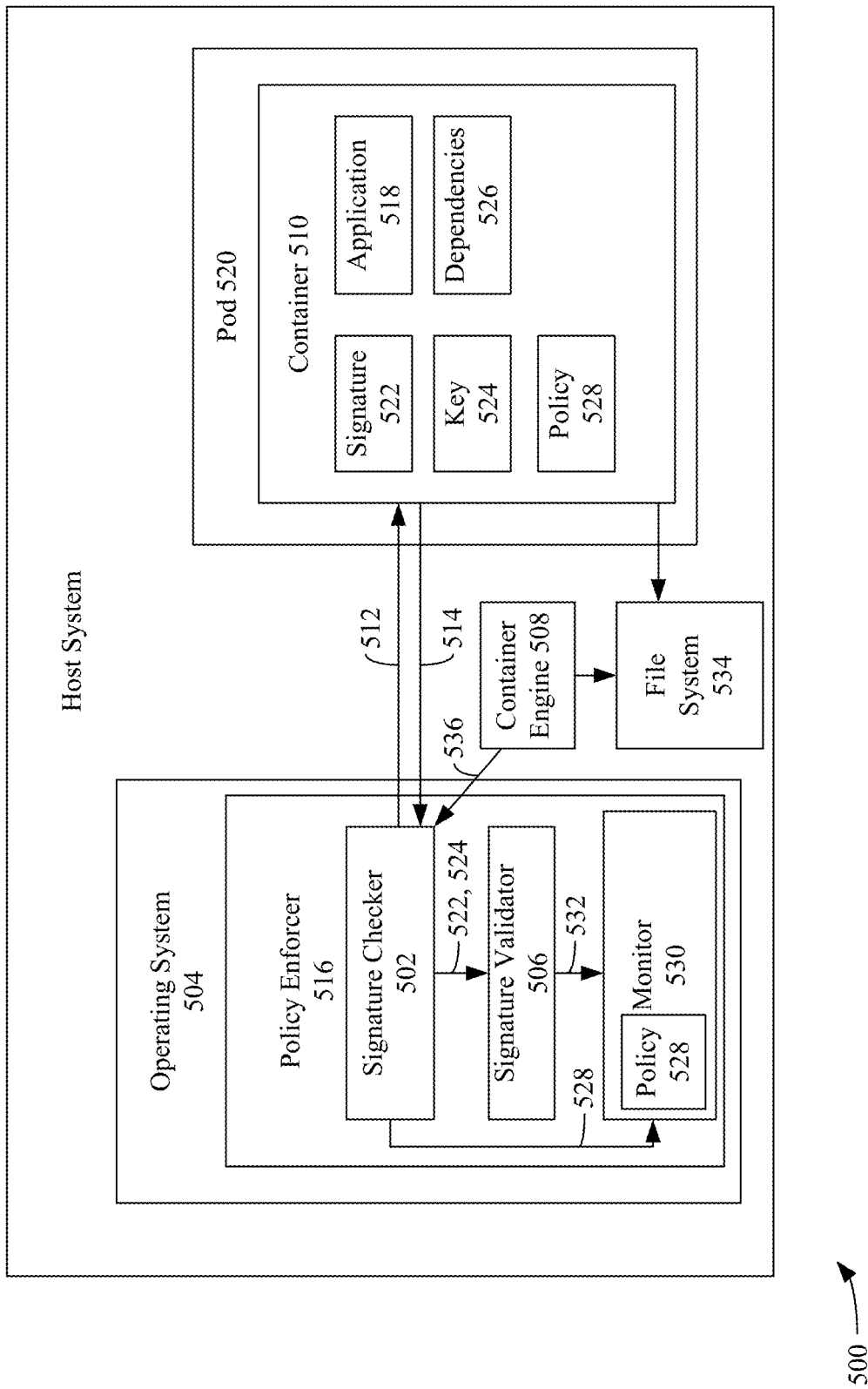
FIG. 5 is a block diagram of a host system configured to determine whether a block device signature is associated with a container, according to an example embodiment.

In accordance with one or more embodiments, policy enforcer 316 may determine whether a block device signature is associated with container 310 at the time a file system of container 310 is mounted. For example, FIG. 4 shows a flowchart 400 of a method for determining whether a block device signature is associated with a container, according to an example embodiment. In an embodiment, flowchart 400 may be implemented by a policy enforcer 516, as shown in FIG. 5. FIG. 5 is a block diagram of a host system 500 configured to determine whether a block device signature is associated with a container 510, according to an example embodiment. As shown in FIG. 5, host system 500 includes an operating system 504, a container engine 508, and a pod 520. Operating system 502 comprises policy enforcer 516, and pod 520 may comprise one or more containers (e.g., container 510). Container 510 comprises an application 518, application dependencies 526, signature file 522, a public key 524, and an integrity policy 528. Host system 500, operating system 504, policy enforcer 516, pod 520, container 510, signature file 522, public key 524, and integrity policy 528 are examples of host system 300, operating system 304, policy enforcer 316, pod 320, container 310, signature file 322, public key 324, and integrity policy 328, as described above with reference to FIG. 3. Container engine 508 is an example of container engine 108, as described above with reference to FIG. 1. As also shown in FIG. 5, policy enforcer 516 comprises a signature checker 502, a signature validator 506, and a monitor 530, which are examples of signature checker 302, signature validator 306, and monitor 330, as respectively described above with reference to FIG. 3. As further shown in FIG. 5, container engine 508 has mounted a file system 534, which is utilized by application 518. Other structural and operational embodiments will be apparent to persons skilled in the relevant art(s) based on the following discussion regarding flowchart 400 and host system 500 of FIG. 5.

Flowchart 400 of FIG. 4 begins with step 402. In step 402, a determination is made as to whether a mounted file system of the container that is utilized by the application is signed with the block device signature. If a determination is made that the mounted file system is not signed with the block device signature, then flowchart 400 continues to step 404. Otherwise, flowchart 400 continues to step 406. For instance, with reference to FIG. 5, signature checker 302 may detect that file system 534 of container 310 has been mounted. For example, container engine 508 may provide an indicator 536 to signature checker 302 that notifies signature checker 502 that file system 534 has been mounted. Responsive to determining that file system 534 has been mounted, signature checker 502 may provide a request 512 to container 310. Responsive to receiving request 512, container 510 may provide a response 514 to signature checker 502 that comprises signature file 522, public key 524 and/or integrity policy 528. Signature checker 502 may analyze signature file 522 to determine whether it comprises a block device signature. If signature file 522 does not comprise a block device signature, flowchart 400 continues to step 404. Otherwise, signature checker 502 provides signature file 522 and public key 524 to signature validator 506 and provides policy 328 to monitor 330. Flowchart 400 then continues to step 406.

At step 404, the file system is unmounted, thereby preventing execution of the application. For example, with reference to FIG. 5, signature checker 502 may provide a command to container engine 508 that causes container engine 508 to unmount file system 534.

At step 406, in response to determining that the mounted file system is signed with the block device signature and that the block device signature is valid, initiation of execution of the application and file access operations performed by the application are monitored for compliance with the integrity policy. For example, with reference to FIG. 5, signature validator 306 may determine whether signature file 522 comprises a valid block device signature. For example, signature validator 506 may calculate a hash of file system 534, decrypt signature of signature file 522 to obtain the top-level root hash using public key 524, and compare the calculated hash value with the top-level root hash. If the hash values are the same, then signature validator 506 determines that the block device signature is valid. In response, signature validator 506 may provide an indicator 532 to monitor 530 to indicate that monitor 530 is to monitor container 510 for initiation of execution of application 518 and file access operations performed by application 518 for compliance with integrity policy 528. If the hash values are different, policy enforcer 516 prevents application 518 from executing, for example, by providing a command to container engine 508 that causes container engine 508 to unmount file system 532.

Figure 6:
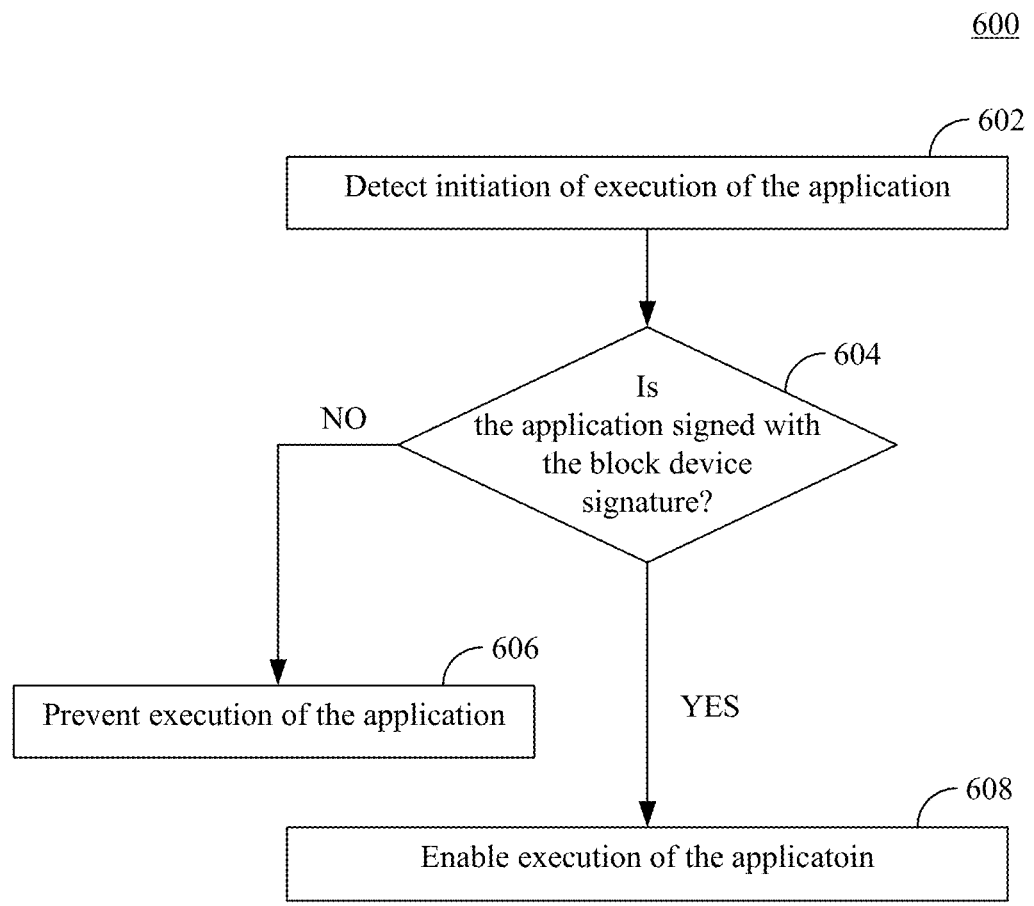
FIG. 6 shows a flowchart of a method for determining whether to enable an application to execute, according to an example embodiment.
Figure 7:
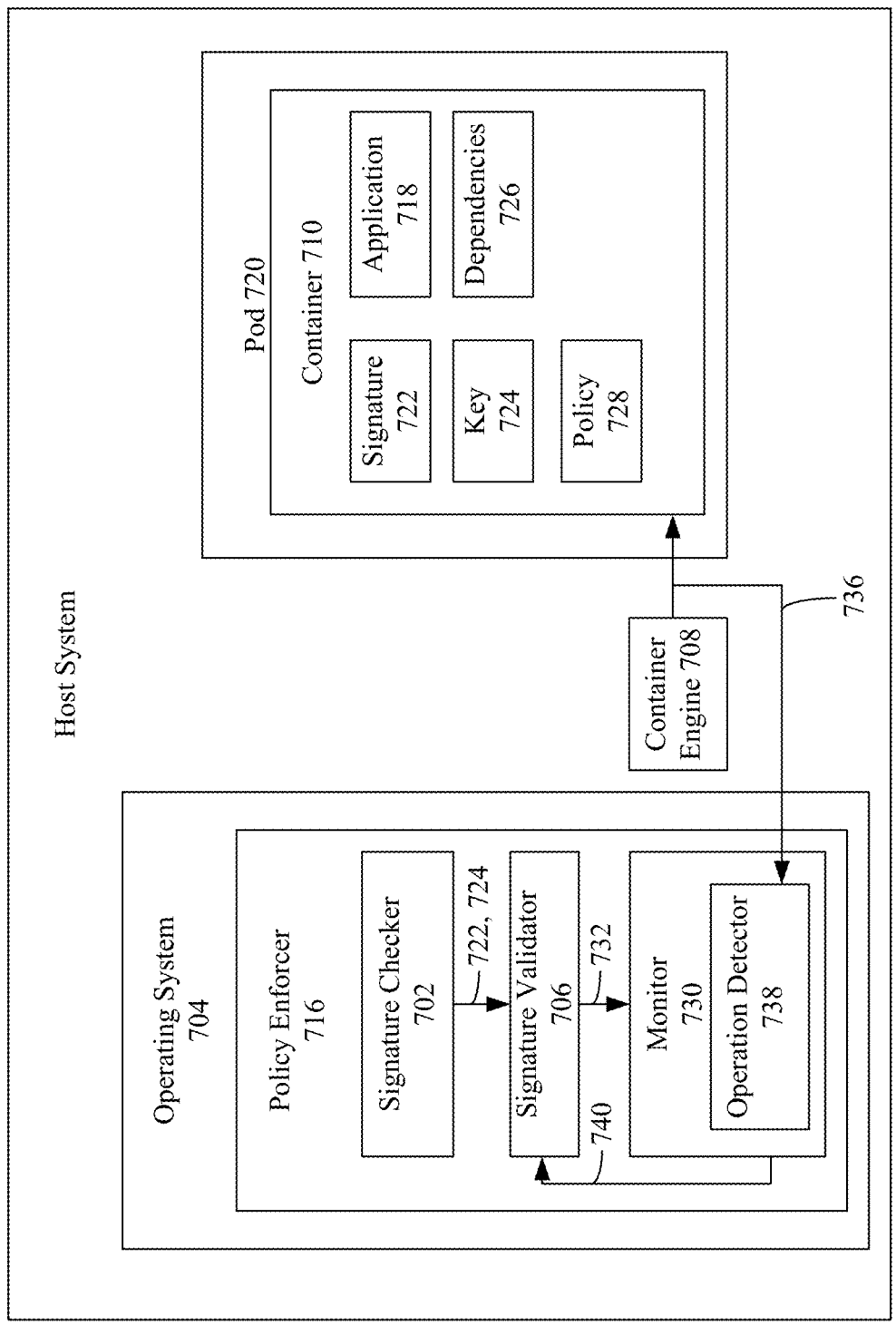
FIG. 7 is a block diagram of a host system configured to determine whether to enable an application to execute, according to an example embodiment.

FIG. 6 shows a flowchart 600 of a method for determining whether an application is enabled to execute, according to an example embodiment. In an embodiment, flowchart 600 may be implemented by a policy enforcer 716, as shown in FIG. 7. FIG. 7 is a block diagram of a host system 700 configured to determine whether an application 718 is enabled to execute, according to an example embodiment. As shown in FIG. 7, host system 700 includes an operating system 704, a container engine 708, and a pod 720. Operating system 702 comprises a policy enforcer 716, and pod 720 may comprise one or more containers (e.g., container 710). Container 710 comprises application 718, application dependencies 726, signature file 722, a public key 724, and an integrity policy 728. Host system 700, operating system 704, policy enforcer 716, pod 720, container 710, signature file 722, public key 724, and integrity policy 728 are examples of host system 500, operating system 504, policy enforcer 516, pod 520, container 510, signature file 522, public key 524, and integrity policy 528, as described above with reference to FIG. 5. Container engine 708 is an example of container engine 508, as described above with reference to FIG. 5. As also shown in FIG. 7, policy enforcer 716 comprises a signature checker 702, a signature validator 706, and a monitor 730, which are examples of signature checker 502, signature validator 506, and monitor 530, as respectively described above with reference to FIG. 5. As further shown in FIG. 7, monitor 730 comprises an operation detector 738. Other structural and operational embodiments will be apparent to persons skilled in the relevant art(s) based on the following discussion regarding flowchart 600 and host system 700 of FIG. 7.

Flowchart 600 of FIG. 6 begins with step 602. In step 602, initiation of execution of the application is detected. For example, operation detector 738 may detect initiation of execution of application 718.

In accordance with one or more embodiments, initiation of execution of the application is detected by hooking a function call that causes the application to execute. For example, with reference to FIG. 7, operation detector 738 may hook a function call 736 issued by container engine 708 that causes application 718 to execute. An example of such a function is the execvc( ) function call, although the embodiments described herein are not so limited. Responsive to hooking function call 736, monitor 730 may provide an indicator 740 to signature validator 706 to indicate that signature validation is required.

In step 604, a determination is made as to whether the application is signed with a valid block device signature (i.e., the block device signature associated with container 710). If a determination is made that the application is not signed with a valid block device signature, then flowchart 600 continues to step 606. Otherwise, flowchart 600 continues to step 608. For example, with reference to FIG. 7, signature validator 706, responsive to receiving indicator 740, may calculate a hash of application 718, decrypt signature of signature file 722 (which is an example of signature file 522, as described a above with reference to FIG. 6) to obtain the top-level root hash using public key 724 (which is an example of public key 524, as described above with reference to FIG. 5), and compare the calculated hash value with the top-level root hash. If the hash values are the same, then signature validator 706 determines that the block device signature of application 718 is valid, and flowchart 600 continues to step 608. If the hash values are different, signature validator 706 determines that the block device signature of application 718 is invalid, and flowchart 600 continues to step 606.

At step 606, execution of the application is prevented. For example, with reference to FIG. 7, operation detector 738 may prevent application 718 from executing by preventing function call 736 from completing.

At step 608, execution of the application is enabled. For example, with reference to FIG. 7, operation detector 738 may enable execution of application 718 by enabling function call 736 to complete.

Figure 8:
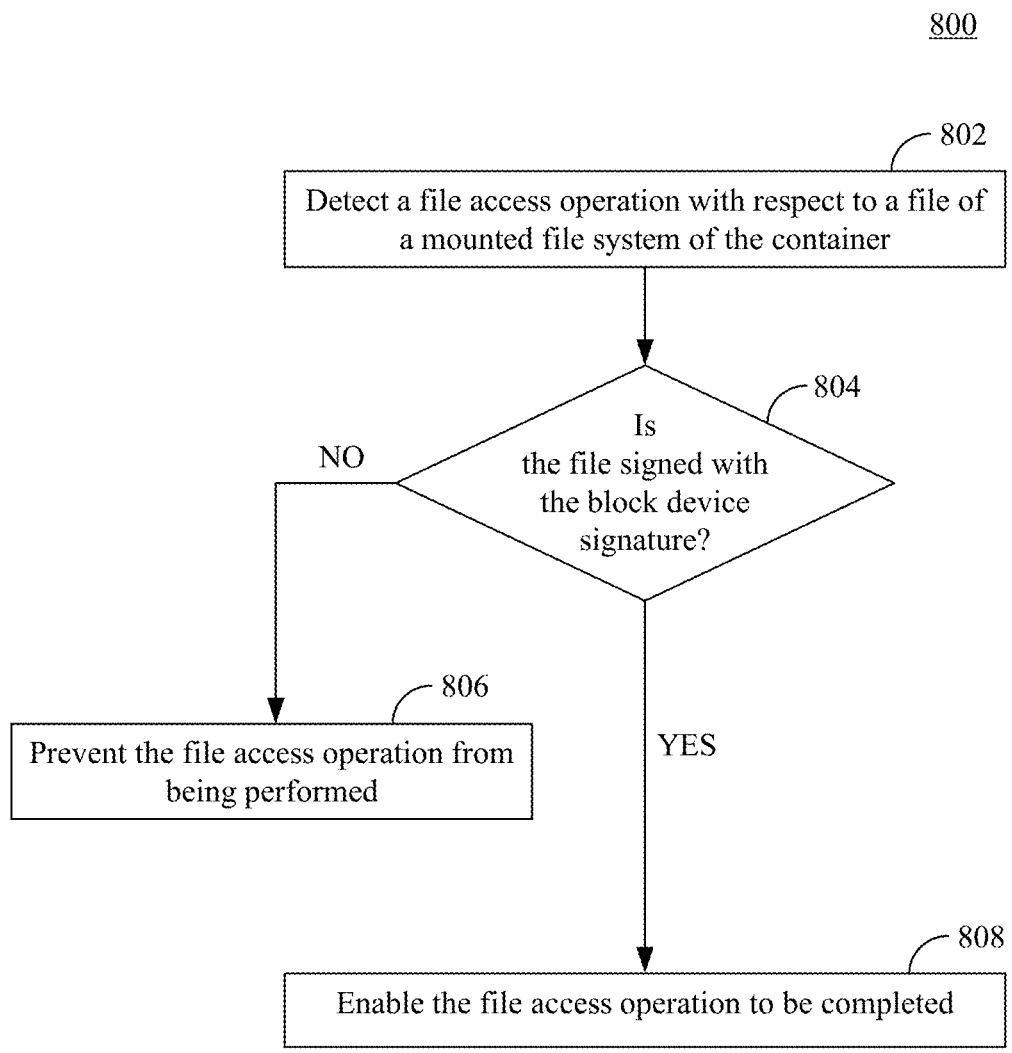
FIG. 8 shows a flowchart of a method for determining whether a file access operation from an application is authorized to complete, according to an example embodiment.
Figure 9:
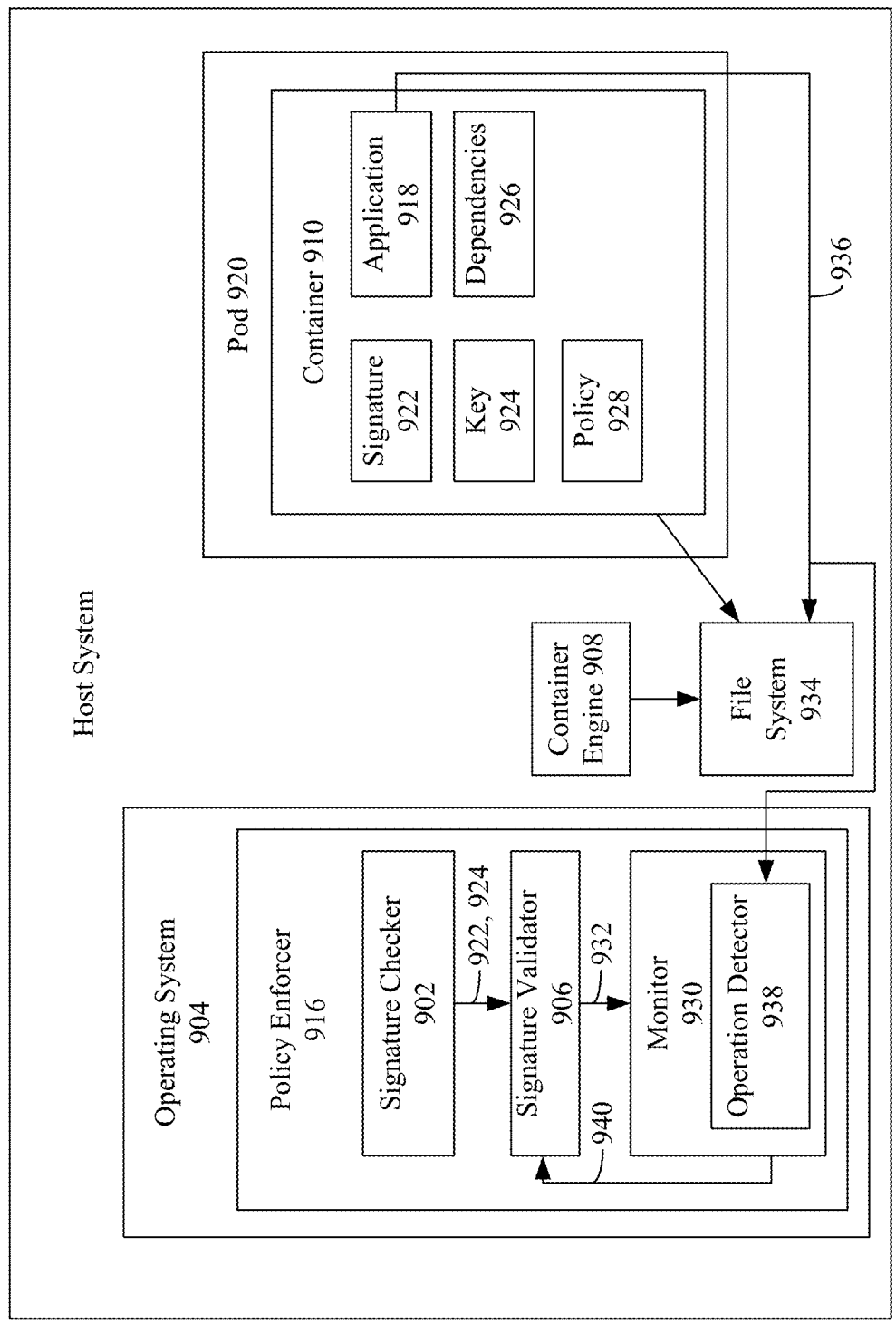
FIG. 9 is a block diagram of a host system configured to determine whether a file access operation from an application is authorized to complete, according to an example embodiment.

FIG. 8 shows a flowchart 800 of a method for determining whether a file access operation from an application is authorized to complete, according to an example embodiment. In an embodiment, flowchart 800 may be implemented by a policy enforcer 916, as shown in FIG. 9. FIG. 9 is a block diagram of a host system 900 configured to determine whether a file access operation from an application 918 is authorized to complete, according to an example embodiment. As shown in FIG. 9, host system 900 includes an operating system 904, a container engine 908, and a pod 920. Operating system 902 comprises a policy enforcer 916, and pod 920 may comprise one or more containers (e.g., container 910). Container 910 comprises an application 918, application dependencies 926, signature file 922, a public key 924, and an integrity policy 928. Host system 900, operating system 904, policy enforcer 916, pod 920, container 910, signature file 922, public key 924, and integrity policy 928 are examples of host system 700, operating system 704, policy enforcer 716, pod 720, container 710, signature file 722, public key 724, and integrity policy 728, as described above with reference to FIG. 7. Container engine 908 is an example of container engine 708, as described above with reference to FIG. 7. As also shown in FIG. 9, policy enforcer 916 comprises a signature checker 902, a signature validator 906, and a monitor 930, which are examples of signature checker 702, signature validator 706, and monitor 730, as respectively described above with reference to FIG. 7. As further shown in FIG. 7, container engine 708 has mounted a file system 932, which is utilized by application 918, and monitor 930 comprises an operation detector 938. File system 932 is an example of file system 532, as described above with reference to FIG. 5. Other structural and operational embodiments will be apparent to persons skilled in the relevant art(s) based on the following discussion regarding flowchart 800 and host system 900 of FIG. 9.

Flowchart 800 of FIG. 8 begins with step 802. In step 802, a file access operation with respect to a file of a mounted file system of the container is detected. For example, operation detector 938 may detect a file access operation 936 with respect to a file of mounted file system 934 of container 910 is detected.

In accordance with one or more embodiments, a file access operation is detected by hooking a function call that is configured to open the file. For example, with reference to FIG. 9, operation detector 938 may hook file access operation 936, which may be function call issued by container 910 that is configured to open a file of file system 934. An example of such a function is the open( ) function call, although the embodiments described herein are not so limited. Responsive to hooking function call 936, monitor 930 may provide an indicator 940 to signature validator 906 to indicate that signature validation is required.

In step 804, a determination is made as to whether the file is signed with a valid block device signature (i.e., the block device signature associated with container 910). If a determination is made that the application is not signed with a valid block device signature, then flowchart 800 continues to step 806. Otherwise, flowchart 800 continues to step 808. For example, with reference to FIG. 9, signature validator 906, responsive to receiving indicator 940 signature validator 906, may calculate a hash of the file of file system 934, decrypt signature of signature file 922 (which is an example of signature file 722, as described a above with reference to FIG. 7) to obtain the top-level root hash using public key 924 (which is an example of public key 724, as described above with reference to FIG. 7), and compare the calculated hash value with the top-level root hash. If the hash values are the same, then signature validator 906 determines that the block device signature of the file is valid, and flowchart 800 continues to step 808. If the hash values are different, signature validator 908 determines that the block device signature of the file invalid and flowchart 800 continues to step 806.

At step 806, the file access operation is prevented. For example, with reference to FIG. 9, operation detector 938 may prevent file access operation 936 from performed by preventing the corresponding function call from completing.

At step 808, execution of the application is enabled. For example, with reference to FIG. 9, operation detector 938 may enable file access operation 936 to be completed by enabling the corresponding function call to complete.

B. Integrity Policy Updates

In certain scenarios, the policy specified by a container is not comprehensive or incomplete. For instance, the policy may be a default policy that is not specific to the application of the container. In such scenarios, legitimate code of the container's application may be prevented from performing certain operations (e.g., file access operations) due to such operations violating the policy. In accordance with an embodiment, the container is audited to determine whether the policy should be modified to properly grant certain operations and/or block other operations. The foregoing may be achieved by executing the application while the integrity policy is placed in an audit mode. During the audit mode, validation detection of the integrity policy is enabled, but enforcement of the integrity policy is disabled. By doing so, any policy violations caused by execution of the application are detected, but the operations are permitted to complete. The operations performed by the application that caused the violations are then analyzed to determine whether such operations are legitimate. If such operations are deemed legitimate, the integrity policy is updated to allow such operations during normal operation (i.e., when the policy is not in audit mode). If such operations are deemed illegitimate, then no changes are made to the integrity policy.

Figure 10:
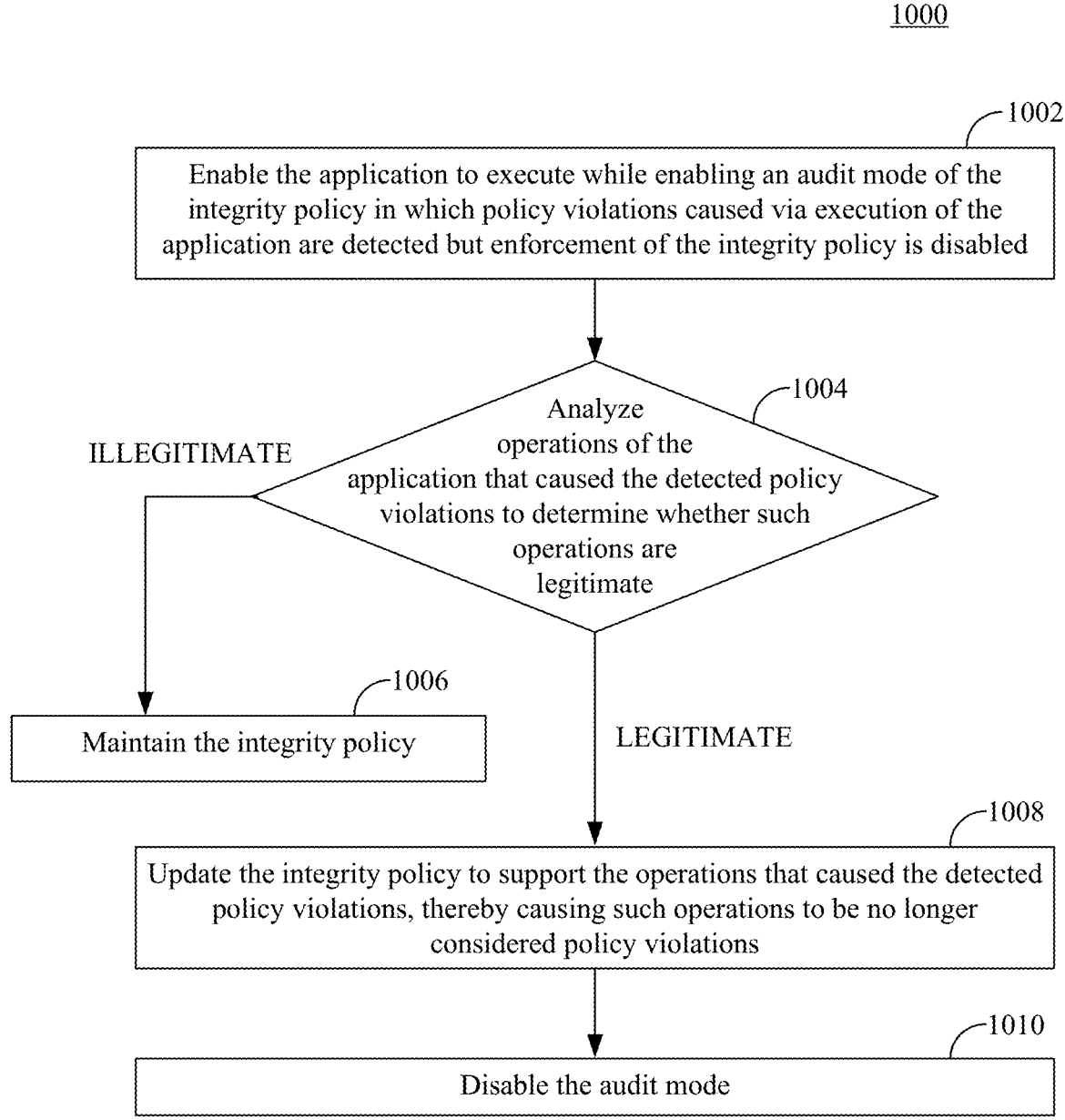
FIG. 10 shows a flowchart of a method for updating an integrity policy, according to an example embodiment.
Figure 11:
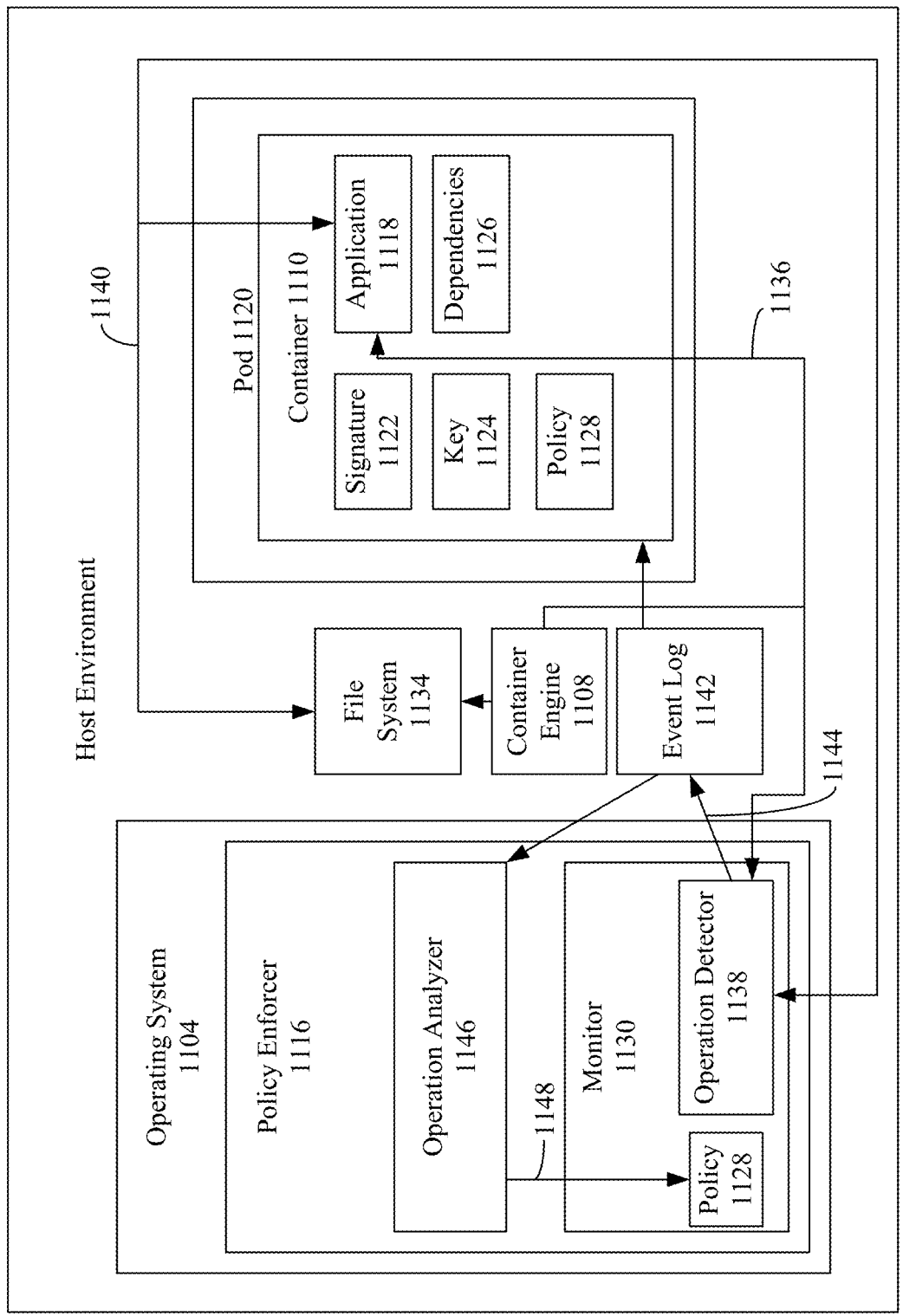
FIG. 11 is a block diagram of a host system configured to update an integrity policy, according to an example embodiment.

FIG. 10 shows a flowchart 1000 of a method for updating an integrity policy, according to an example embodiment. In an embodiment, flowchart 1000 may be implemented by a policy enforcer 1116, as shown in FIG. 11. FIG. 11 is a block diagram of a host system 1100 configured to update an integrity policy 1128, according to an example embodiment. As shown in FIG. 11, host system 1100 includes an operating system 1104 and a pod 1120. Operating system 1102 comprises a policy enforcer 1116, and pod 1120 may comprise one or more containers (e.g., container 1110). Container 1110 comprises an application 1118, application dependencies 1126, signature file 1122, a public key 1124, and integrity policy 1128. Host system 1100, operating system 1104, policy enforcer 1116, pod 1120, container 1110, signature file 1122, public key 1124, and integrity policy 1128 are examples of host system 900, operating system 904, policy enforcer 916, pod 920, container 910, signature file 922, public key 924, and integrity policy 928, as described above with reference to FIG. 9. As also shown in FIG. 11, policy enforcer 1116 comprises a monitor 1130 and an operation analyzer 1146. Monitor 1130 is an example monitor 930, as described above with reference to FIG. 9. As further shown in FIG. 11, container engine 1108 has mounted a file system 1134, which is utilized by application 1118, and monitor 1130 comprises an operation detector 1138 and integrity policy 1128. Operation detector 1138 is an example of operation detector 938, as described above with reference to FIG. 9. Other structural and operational embodiments will be apparent to persons skilled in the relevant art(s) based on the following discussion regarding flowchart 1000 and host system 1100 of FIG. 11.

Flowchart 1000 of FIG. 10 begins with step 1002. In step 1002, the application is enabled to execute while enabling an audit mode of the integrity policy in which policy violations caused via execution of the application are detected but enforcement of the integrity policy is disabled. For example, with reference to FIG. 11, policy enforcer 1116 may place integrity policy 1128 in audit mode. Operation detector 1138 may detect initiation of execution of application 1118 via a function call 1136 that causes application 1118 to execute and allow function call 1136 to complete successfully, thereby enabling application 1118 to execute while integrity policy 1128 is an audit mode. Function call 1136 is an example of function call 736, as described above with reference to FIG. 7.

In step 1004, operations of the application that caused the detected policy violations are analyzed to determine whether the operations are legitimate. If the operations are determined to be illegitimate, flowchart 1000 continues to step 1006. Otherwise, flowchart 1000 continues to step 1008. For example, with reference to FIG. 11, operation detector 1138 may detect various file access operations 1140 performed by application 1118 with respect to file system 1134. Operation detector 1138 may determine whether such file access operations 1140 conform with the rules of integrity policy 1128. For instance, if a file access operation violates a rule of the integrity policy 1128, operation detector 1138 logs the violation and information associated with the file access operation into an event log 1142 via a write command 1144. The information may include the type of file access operation (e.g., a read operation, a write operation, a file open operation), the name of the directory and/or file that was accessed, the data that was read from and/or written to the file, etc.

Operation analyzer 1146 may analyze the violations logged in event log 1142 to determine whether the associated file access operations are legitimate or illegitimate. For instance, operation analyzer 1146 may compare the file access operations specified by event log 1142 to file access operations that are typical of legitimate file access operations and are typical of illegitimate file access operations (e.g., file access operations to files that contain sensitive information such, as user credentials (e.g., usernames, passwords, PIN numbers, credit card numbers, social security numbers, etc.), file access operations that perform a particular sequence of reads and/or writes that is typical of a malicious process (such as a virus, malware, etc.)). If operation analyzer 1146 determines that file access operations 1140 are illegitimate, flowchart 1000 continues to step 1006. Otherwise, flowchart 1000 continues to step 1008.

In accordance with an embodiment, operation analyzer 1146 may utilize machine learning-based techniques that analyze file access operations to determine whether such operations are legitimate or illegitimate. For instance, a file access operation classification model may be generated by training a machine learning-based algorithm on file access operations that are known to be used for malicious (or illegitimate) purposes and file access operations that are known to be used for non-malicious (legitimate) purposes. Using these file access operations, the machine learning-based algorithm learns what constitutes a legitimate file access operation and generates the file access operation classification model. The file access operation classification model is used to classify any file access operation performed by an application (e.g., application 1118) as being a legitimate file access operation or an illegitimate file access operation.

At step 1006, the integrity policy is maintained. For example, with reference to FIG. 11, integrity policy 1128 is maintained. That is, the rules of integrity policy 1128 are not changed, and file access operations to files that violate integrity policy 1128 will be prevented from being performed.

At step 1008, the integrity policy is updated to support the operations that cause the detected policy violations, thereby causing such operations to be no longer considered policy violations. For example, with reference to FIG. 11, operation analyzer 1146 may provide an update 1148 to integrity policy 1128 that updates the rules of integrity policy 1128. Update 1148 may specify the file access operation(s) that are allowed for one or more particular directories and/or files of file system 1134. Accordingly, file access operations that were previously considered illegitimate will be considered legitimate and such file access operations will no longer cause policy violations.

At step 1010, the audit mode is disabled. For example, with reference to FIG. 11, monitor 1130 may disable the audit mode of policy 1128. Thereafter, all file access operations attempted by application 1118 must comply with integrity policy 1128 in order for the operations to complete.

C. Integrity Policies for Unsigned Containers

As described above in Subsection A, if a container does not comprise a block device signature, the application associated with the container is prevented from being executed. However, in certain embodiments, unsigned containers may be deployed to a host system and executed thereby. Initially, such containers may be executed while the integrity policy utilized by the policy enforcer (e.g., policy enforcer 1116) is in audio mode, as described above in Subsection B. During execution, file access operations performed by the container's application are monitored to determine the behavior of the application. For example, the directories and/or files that are accessed (e.g., opened, written to, and/or read from) by the application are determined and/or analyzed to determine whether such operations are legitimate or illegitimate in a similar fashion as described above in Subsection B. Based on the analysis of the file access operations, an integrity policy is generated for the container that specifies which directories and/or files are accessible to the application. Thereafter, the container is signed with a block device signature by the policy enforcer. The signed container is then re-executed with audit mode disabled. The signed container is then verified for integrity in similar manner as described above with in Subsection A.

IV. Example Computer System Implementation

Host system 102, operating system 104, container orchestrator 106, container 108, container(s) 110A-11B, signature 122, public key 124, integrity policy 128, pod 120, policy enforcer 116, host system 300, operating system 304, policy enforcer 316, signature checker 302, signature validator 306, monitor 330, integrity policy 328, pod 320, container 310, signature 322, public key 324, integrity policy 328, application 318, dependencies 326, host system 500, operating system 504, policy enforcer 516, signature checker 502, signature validator 506, monitor 530, integrity policy 528, pod 520, container 510, signature 522, public key 524, integrity policy 528, application 518, dependencies 526, container engine 508, file system 534, host system 700, operating system 704, policy enforcer 716, signature checker 702, signature validator 706, monitor 730, integrity policy 728, pod 720, container 710, signature 722, public key 724, integrity policy 728, application 718, dependencies 726, container engine 708, operation detector 738, host system 900, operating system 904, policy enforcer 916, signature checker 902, signature validator 906, monitor 930, integrity policy 928, pod 920, container 910, signature 922, public key 924, integrity policy 928, application 918, dependencies 926, container engine 908, file system 934, operation detector 938, host system 1100, operating system 1104, policy enforcer 1116, monitor 1130, integrity policy 1128, pod 1120, container 1110, signature 1122, public key 1124, integrity policy 1128, application 1118, dependencies 1126, container engine 1108, file system 1134, event log 1142, and operation detector 1138, (and/or any of the components described therein), and/or flowchart 200, 400, 600, 800, and/or 1000, may be implemented in hardware, or hardware combined with one or both of software and/or firmware. For example, host system 102, operating system 104, container orchestrator 106, container 108, container(s) 110A-11B, signature 122, public key 124, integrity policy 128, pod 120, policy enforcer 116, host system 300, operating system 304, policy enforcer 316, signature checker 302, signature validator 306, monitor 330, integrity policy 328, pod 320, container 310, signature 322, public key 324, integrity policy 328, application 318, dependencies 326, host system 500, operating system 504, policy enforcer 516, signature checker 502, signature validator 506, monitor 530, integrity policy 528, pod 520, container 510, signature 522, public key 524, integrity policy 528, application 518, dependencies 526, container engine 508, file system 534, host system 700, operating system 704, policy enforcer 716, signature checker 702, signature validator 706, monitor 730, integrity policy 728, pod 720, container 710, signature 722, public key 724, integrity policy 728, application 718, dependencies 726, container engine 708, operation detector 738, host system 900, operating system 904, policy enforcer 916, signature checker 902, signature validator 906, monitor 930, integrity policy 928, pod 920, container 910, signature 922, public key 924, integrity policy 928, application 918, dependencies 926, container engine 908, file system 934, operation detector 938, host system 1100, operating system 1104, policy enforcer 1116, monitor 1130, integrity policy 1128, pod 1120, container 1110, signature 1122, public key 1124, integrity policy 1128, application 1118, dependencies 1126, container engine 1108, file system 1134, event log 1142, and operation detector 1138, (and/or any of the components described therein), and/or flowchart 200, 400, 600, 800, and/or 1000 may be implemented as computer program code/instructions configured to be executed in one or more processors and stored in a computer readable storage medium.

Alternatively, host system 102, operating system 104, container orchestrator 106, container 108, container(s) 110A-11B, signature 122, public key 124, integrity policy 128, pod 120, policy enforcer 116, host system 300, operating system 304, policy enforcer 316, signature checker 302, signature validator 306, monitor 330, integrity policy 328, pod 320, container 310, signature 322, public key 324, integrity policy 328, application 318, dependencies 326, host system 500, operating system 504, policy enforcer 516, signature checker 502, signature validator 506, monitor 530, integrity policy 528, pod 520, container 510, signature 522, public key 524, integrity policy 528, application 518, dependencies 526, container engine 508, file system 534, host system 700, operating system 704, policy enforcer 716, signature checker 702, signature validator 706, monitor 730, integrity policy 728, pod 720, container 710, signature 722, public key 724, integrity policy 728, application 718, dependencies 726, container engine 708, operation detector 738, host system 900, operating system 904, policy enforcer 916, signature checker 902, signature validator 906, monitor 930, integrity policy 928, pod 920, container 910, signature 922, public key 924, integrity policy 928, application 918, dependencies 926, container engine 908, file system 934, operation detector 938, host system 1100, operating system 1104, policy enforcer 1116, monitor 1130, integrity policy 1128, pod 1120, container 1110, signature 1122, public key 1124, integrity policy 1128, application 1118, dependencies 1126, container engine 1108, file system 1134, event log 1142, and operation detector 1138, (and/or any of the components described therein), and/or flowchart 200, 400, 600, 800, and/or 1000 may be implemented as hardware logic/electrical circuitry.

For instance, in an embodiment, one or more, in any combination, of host system 102, operating system 104, container orchestrator 106, container 108, container(s) 110A-11B, signature 122, public key 124, integrity policy 128, pod 120, policy enforcer 116, host system 300, operating system 304, policy enforcer 316, signature checker 302, signature validator 306, monitor 330, integrity policy 328, pod 320, container 310, signature 322, public key 324, integrity policy 328, application 318, dependencies 326, host system 500, operating system 504, policy enforcer 516, signature checker 502, signature validator 506, monitor 530, integrity policy 528, pod 520, container 510, signature 522, public key 524, integrity policy 528, application 518, dependencies 526, container engine 508, file system 534, host system 700, operating system 704, policy enforcer 716, signature checker 702, signature validator 706, monitor 730, integrity policy 728, pod 720, container 710, signature 722, public key 724, integrity policy 728, application 718, dependencies 726, container engine 708, operation detector 738, host system 900, operating system 904, policy enforcer 916, signature checker 902, signature validator 906, monitor 930, integrity policy 928, pod 920, container 910, signature 922, public key 924, integrity policy 928, application 918, dependencies 926, container engine 908, file system 934, operation detector 938, host system 1100, operating system 1104, policy enforcer 1116, monitor 1130, integrity policy 1128, pod 1120, container 1110, signature 1122, public key 1124, integrity policy 1128, application 1118, dependencies 1126, container engine 1108, file system 1134, event log 1142, and operation detector 1138, (and/or any of the components described therein), and/or flowchart 200, 400, 600, 800, and/or 1000 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 12:
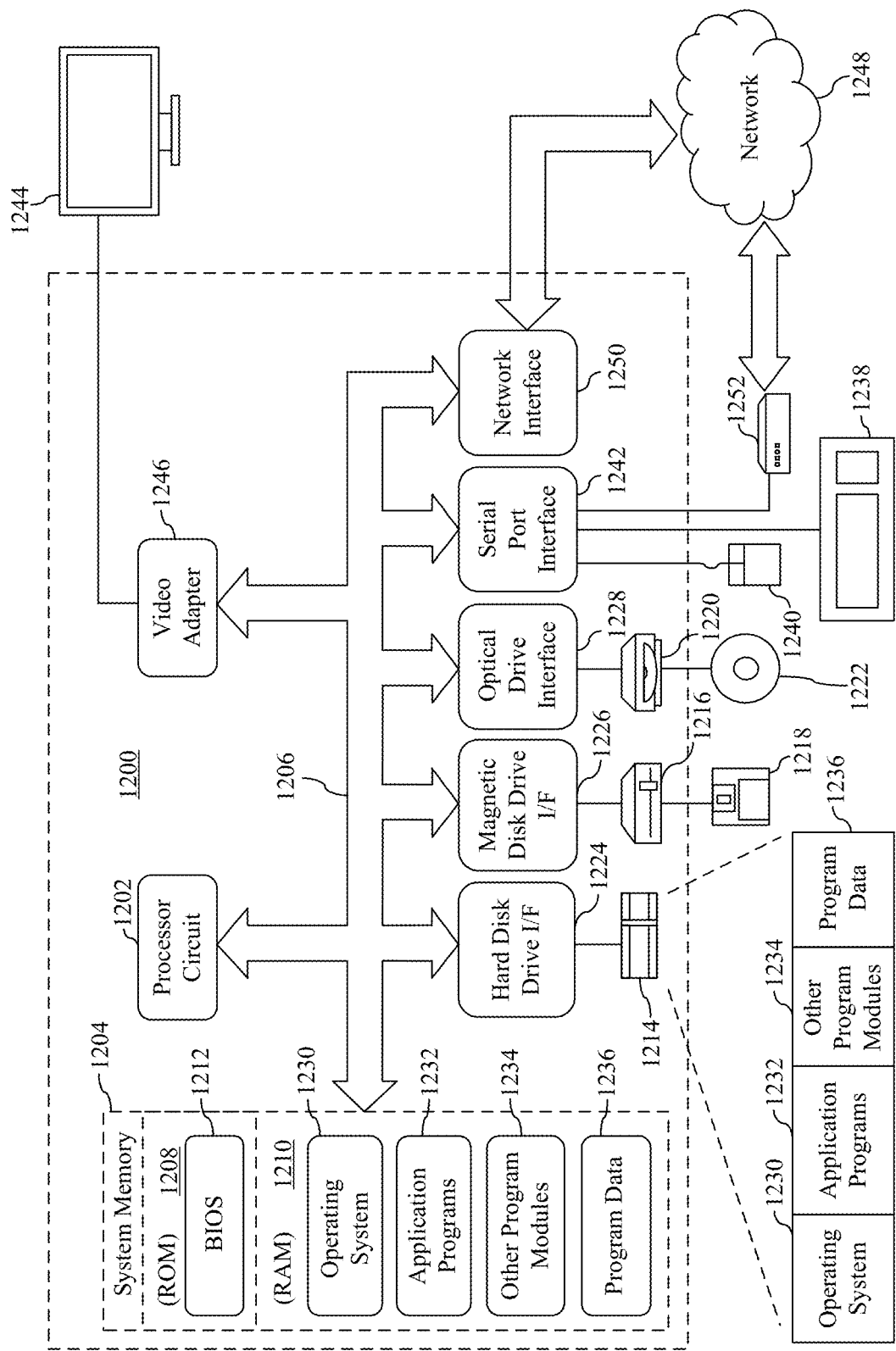
FIG. 12 is a block diagram of an example processor-based computer system that may be used to implement various embodiments.

FIG. 12 depicts an exemplary implementation of a computing device 1200 in which embodiments may be implemented. For example, host systems 102, 300, 500, 700, 900, and 1100 may be implemented in one or more computing devices similar to computing device 1200 in stationary or mobile computer embodiments, including one or more features of computing device 1200 and/or alternative features. The description of computing device 1200 provided herein is provided for purposes of illustration, and is not intended to be limiting. Embodiments may be implemented in further types of computer systems, as would be known to persons skilled in the relevant art(s).

As shown in FIG. 12, computing device 1200 includes one or more processors, referred to as processor circuit 1202, a system memory 1204, and a bus 1206 that couples various system components including system memory 1204 to processor circuit 1202. Processor circuit 1202 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1202 may execute program code stored in a computer readable medium, such as program code of operating system 1230, application programs 1232, other programs 1234, etc. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random-access memory (RAM) 1210. A basic input/output system 1212 (BIOS) is stored in ROM 1208.

Computing device 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1230, one or more application programs 1232, other programs 1234, and program data 1236. Application programs 1232 or other programs 1234 may include, for example, computer program logic (e.g., computer program code or instructions) for implementing any of the features of host system 102, operating system 104, container orchestrator 106, container 108, container(s) 110A-11B, signature 122, public key 124, integrity policy 128, pod 120, policy enforcer 116, host system 300, operating system 304, policy enforcer 316, signature checker 302, signature validator 306, monitor 330, integrity policy 328, pod 320, container 310, signature 322, public key 324, integrity policy 328, application 318, dependencies 326, host system 500, operating system 504, policy enforcer 516, signature checker 502, signature validator 506, monitor 530, integrity policy 528, pod 520, container 510, signature 522, public key 524, integrity policy 528, application 518, dependencies 526, container engine 508, file system 534, host system 700, operating system 704, policy enforcer 716, signature checker 702, signature validator 706, monitor 730, integrity policy 728, pod 720, container 710, signature 722, public key 724, integrity policy 728, application 718, dependencies 726, container engine 708, operation detector 738, host system 900, operating system 904, policy enforcer 916, signature checker 902, signature validator 906, monitor 930, integrity policy 928, pod 920, container 910, signature 922, public key 924, integrity policy 928, application 918, dependencies 926, container engine 908, file system 934, operation detector 938, host system 1100, operating system 1104, policy enforcer 1116, monitor 1130, integrity policy 1128, pod 1120, container 1110, signature 1122, public key 1124, integrity policy 1128, application 1118, dependencies 1126, container engine 1108, file system 1134, event log 1142, and operation detector 1138, (and/or any of the components described therein), and/or flowchart 200, 400, 600, 800, and/or 1000, and/or further embodiments described herein.

A user may enter commands and information into computing device 1200 through input devices such as keyboard 1238 and pointing device 1240. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1202 through a serial port interface 1242 that is coupled to bus 1206, but may be connected by other interfaces, such as a parallel port, game port, or a universal serial bus (USB).

A display screen 1244 is also connected to bus 1206 via an interface, such as a video adapter 1246. Display screen 1244 may be external to, or incorporated in computing device 1200. Display screen 1244 may display information, as well as being a user interface for receiving user commands and/or other information (e.g., by touch, finger gestures, virtual keyboard, etc.). In addition to display screen 1244, computing device 1200 may include other peripheral output devices (not shown) such as speakers and printers.

Computing device 1200 is connected to a network 1248 (e.g., the Internet) through an adaptor or network interface

1250, a modem 1252, or other means for establishing communications over the network. Modem 1252, which may be internal or external, may be connected to bus 1206 via serial port interface 1242, as shown in FIG. 12, or may be connected to bus 1206 using another interface type, including a parallel interface.

As used herein, the terms "computer program medium," "computer-readable medium," and "computer-readable storage medium" are used to refer to physical hardware media such as the hard disk associated with hard disk drive 1214, removable magnetic disk 1218, removable optical disk 1222, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1232 and other programs 1234) may be stored on the hard disk, magnetic disk, optical disk, ROM, RAM, or other hardware storage medium. Such computer programs may also be received via network interface 1250, serial port interface 1242, or any other interface type. Such computer programs, when executed or loaded by an application, enable computing device 1200 to implement features of embodiments discussed herein. Accordingly, such computer programs represent controllers of the computing device 1200.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

III. Additional Example Embodiments

A method performed by an operating system for enforcing an integrity policy for a container managed by the operating system is described herein. The method comprises: determining whether a block device signature is associated with a container that packages an application and dependencies that enable the application to execute, the block device signature also associated with the application and the dependencies as a result of being associated with the container; in response to determining that the block device signature is associated with the container: determining whether the block device signature is valid; in response to determining that the block device signature is valid, monitoring initiation of execution of the application and file access operations performed by the application for compliance with the integrity policy; and in response to determining that the block device signature is invalid, preventing execution of the application; and in response to determining that a block device signature is not associated with the container, preventing execution of the application of the container.

In one embodiment of the foregoing method, said determining whether a block device signature is associated with a container comprises: determining whether a mounted file system of the container that is utilized by the application is signed with the block device signature; in response to determining that the mounted file system is not signed with the block device signature, unmounting the file system, thereby preventing execution of the application; and in response to determining that the mounted file system is signed with the block device signature and that the block device signature is valid, monitoring initiation of execution of the application and file access operations performed by the application for compliance with the integrity policy.

In one embodiment of the foregoing method, said monitoring comprises: detecting initiation of execution of the application; determining whether the application is signed with a valid block device signature; in response to determining that the application is not signed with a valid block device signature, preventing execution of the application; and in response to determining that the application is signed with a valid block device signature, enabling execution of the application.

In one embodiment of the foregoing method, said detecting comprises: hooking a function call that causes the application to execute.

In one embodiment of the foregoing method, said monitoring comprises: detecting a file access operation with respect to a file of a mounted file system of the container; determining whether the file is signed with a valid block device signature; in response to determining that the file is not signed with a valid block device signature, preventing the file access operation from being performed; and in response to determining that the file is signed with a valid block device signature, enabling the file access operation to be completed.

In one embodiment of the foregoing method, said detecting comprises: hooking a function call configured to open the file.

In one embodiment of the foregoing method, the method further comprises: enabling the application to execute while enabling an audit mode of the integrity policy in which policy violations caused via execution of the application are detected but enforcement of the integrity policy is disabled; analyzing operations of the application that caused the detected policy violations to determine whether such operations are legitimate; in response to determining that the operations are legitimate: updating the integrity policy to support the operations that caused the detected policy violations, thereby causing such operations to be no longer considered policy violations; and disabling the audit mode; and in response to determining that the operations are illegitimate, maintaining the integrity policy.

A system is also described herein. The system includes at least one processor circuit; and at least one memory that stores program code configured to be executed by the at least one processor circuit, the program code comprising: a signature checker configured to determine whether a block device signature is associated with a container that packages an application and dependencies that enable the application to execute, the block device signature also associated with the application and the dependencies as a result of being associated with the container, the application of the container being prevented from being executed in response to a determination that the block device signature is not associated with the container; a signature validator configured to, in response to determining that the block device signature is associated with the container, determine whether the block device signature is valid; and a monitor configured to: in response to a determination that the block device signature is valid, monitor initiation of execution of the application and file access operations performed by the application for compliance with an integrity policy; and in response to a determination that the block device signature is invalid, prevent execution of the application.

In one embodiment of the foregoing system, the signature checker is further configured to: determine whether a mounted file system of the container that is utilized by the application is signed with the block device signature; and in response to a determination that the mounted file system is not signed with the block device signature, cause the file system to be unmounted, thereby preventing execution of the application; and wherein the monitor is further configured to, in response to a determination that the mounted file system is signed with the block device signature and that the block device signature is valid, monitor initiation of execution of the application and file access operations performed by the application for compliance with the integrity policy.

In one embodiment of the foregoing system, the program code further comprises an operation detector configured to detect initiation of execution of the application, wherein the signature validator is further configured to determine whether the application is signed with a valid block device signature, and wherein the monitor is further configured to: in response to a determination that the application is not signed with a valid block device signature, prevent execution of the application; and in response to a determination that the application is signed with a valid block device signature, enable execution of the application.

In one embodiment of the foregoing system, the operation detector is configured to detect initiation of execution of the application by hooking a function call that causes the application to execute.

In one embodiment of the foregoing system, the program code further comprises an operation detector configured to detect a file access operation with respect to a file of a mounted file system of the container, wherein the signature validator is further configured to determine whether the file is signed with a valid block device signature, and wherein the monitor is further configured to: in response to a determination that the file is not signed with a valid block device signature, prevent the file access operation from being performed; an in response to a determination that the file is signed with a valid block device signature, enable the file access operation to be completed.

In one embodiment of the foregoing system, the operation detector is configured to detect the file access operation by hooking a function call configured to open the file.

In one embodiment of the foregoing system, the invocation request comprises one or more parameters that specify at least one of a name of the host browser interface or a location from which to load the host browser interface.

In one embodiment of the foregoing system, the program code further comprises: a policy enforcer configured to enable the application to execute while enabling an audit mode of the integrity policy in which policy violations caused via execution of the application are detected but enforcement of the integrity policy is disabled; and an operation analyzer configured to: analyze operations of the application that caused the detected policy violations to determine whether such operations are legitimate; in response to a determination that the operations are legitimate: update the integrity policy to support the operations that caused the detected policy violations, thereby causing such operations to be no longer considered policy violations; and disable the audit mode; and in response to a determination that the operations are illegitimate, maintain the integrity policy.

A computer-readable storage medium having program instructions recorded thereon that, when executed by at least one processor of a computing device, perform a method. The method comprises: determining whether a block device signature is associated with a container that packages an application and dependencies that enable the application to execute, the block device signature also associated with the application and the dependencies as a result of being associated with the container; in response to determining that the block device signature is associated with the container: determining whether the block device signature is valid; in response to determining that the block device signature is valid, monitoring initiation of execution of the application and file access operations performed by the application for compliance with the integrity policy; and in response to determining that the block device signature is invalid, preventing execution of the application; and in response to determining that a block device signature is not associated with the container, preventing execution of the application of the container.

In one embodiment of the foregoing computer-readable storage medium, said determining whether a block device signature is associated with a container comprises: determining whether a mounted file system of the container that is utilized by the application is signed with the block device signature; in response to determining that the mounted file system is not signed with the block device signature, unmounting the file system, thereby preventing execution of the application; and in response to determining that the mounted file system is signed with the block device signature and that the block device signature is valid, monitoring initiation of execution of the application and file access operations performed by the application for compliance with the integrity policy.

In one embodiment of the foregoing computer-readable storage medium, said monitoring comprises: detecting initiation of execution of the application; determining whether the application is signed with a valid block device signature; in response to determining that the application is not signed with a valid block device signature, preventing execution of the application; and in response to determining that the application is signed with a valid block device signature, enabling execution of the application.

In one embodiment of the foregoing computer-readable storage medium, said detecting comprises: hooking a function call that causes the application to execute.

In one embodiment of the foregoing computer-readable storage medium, said monitoring comprises: detecting a file access operation with respect to a file of a mounted file system of the container; determining whether the file is signed with a valid block device signature; in response to determining that the file is not signed with a valid block device signature, preventing the file access operation from being performed; and in response to determining that the file is signed with a valid block device signature, enabling the file access operation to be completed.

In one embodiment of the foregoing computer-readable storage medium, said detecting comprises: hooking a function call configured to open the file.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method performed by an operating system for enforcing an integrity policy for a container managed by the operating system, comprising:
   determining whether a block device signature is associated with a container that packages an application and dependencies that enable the application to execute, the block device signature also associated with the application and the dependencies as a result of being associated with the container;
   in response to determining that the block device signature is associated with the container:
      determining whether the block device signature is valid;
      in response to determining that the block device signature is valid, monitoring initiation of execution of the application and file access operations performed by the application for compliance with the integrity policy; and
      in response to determining that the block device signature is invalid, preventing execution of the application; and
   in response to determining that a block device signature is not associated with the container, preventing execution of the application of the container.

2. The method of claim 1, wherein said determining whether a block device signature is associated with a container comprises:
   determining whether a mounted file system of the container that is utilized by the application is signed with the block device signature;
   in response to determining that the mounted file system is not signed with the block device signature, unmounting the file system, thereby preventing execution of the application; and
   in response to determining that the mounted file system is signed with the block device signature and that the block device signature is valid, monitoring initiation of execution of the application and file access operations performed by the application for compliance with the integrity policy.

3. The method of claim 1, wherein said monitoring comprises:
   detecting initiation of execution of the application;
   determining whether the application is signed with a valid block device signature;
   in response to determining that the application is not signed with a valid block device signature, preventing execution of the application; and
   in response to determining that the application is signed with a valid block device signature, enabling execution of the application.

4. The method of claim 1, wherein said detecting comprises:
   hooking a function call that causes the application to execute.

5. The method of claim 1, wherein said monitoring comprises:
   detecting a file access operation with respect to a file of a mounted file system of the container;
   determining whether the file is signed with a valid block device signature;
   in response to determining that the file is not signed with a valid block device signature, preventing the file access operation from being performed; and
   in response to determining that the file is signed with a valid block device signature, enabling the file access operation to be completed.

6. The method of claim 1, wherein said detecting comprises:
   hooking a function call configured to open the file.

7. The method of claim 1, further comprising:
   enabling the application to execute while enabling an audit mode of the integrity policy in which policy violations caused via execution of the application are detected but enforcement of the integrity policy is disabled;
   analyzing operations of the application that caused the detected policy violations to determine whether such operations are legitimate;
   in response to determining that the operations are legitimate:
      updating the integrity policy to support the operations that caused the detected policy violations, thereby causing such operations to be no longer considered policy violations; and
      disabling the audit mode; and
   in response to determining that the operations are illegitimate, maintaining the integrity policy.

8. A system, comprising:
   at least one processor circuit; and
   at least one memory that stores program code configured to be executed by the at least one processor circuit, the program code comprising:
      a signature checker configured to determine whether a block device signature is associated with a container that packages an application and dependencies that enable the application to execute, the block device signature also associated with the application and the dependencies as a result of being associated with the container, the application of the container being prevented from being executed in response to a determination that the block device signature is not associated with the container;
      a signature validator configured to, in response to determining that the block device signature is associated with the container, determine whether the block device signature is valid; and
      a monitor configured to:
         in response to a determination that the block device signature is valid, monitor initiation of execution of the application and file access operations performed by the application for compliance with an integrity policy; and
         in response to a determination that the block device signature is invalid, prevent execution of the application.

9. The system of claim 8, wherein the signature checker is further configured to:
   determine whether a mounted file system of the container that is utilized by the application is signed with the block device signature; and
   in response to a determination that the mounted file system is not signed with the block device signature, cause the file system to be unmounted, thereby preventing execution of the application; and wherein the monitor is further configured to, in response to a determination that the mounted file system is signed with the block device signature and that the block device signature is valid, monitor initiation of execution of the application and file access operations performed by the application for compliance with the integrity policy.

10. The system of claim 8, wherein the program code further comprises an operation detector configured to detect initiation of execution of the application,
   wherein the signature validator is further configured to determine whether the application is signed with a valid block device signature, and
   wherein the monitor is further configured to:
      in response to a determination that the application is not signed with a valid block device signature, prevent execution of the application; and
      in response to a determination that the application is signed with a valid block device signature, enable execution of the application.

11. The system of claim 8, wherein the operation detector is configured to detect initiation of execution of the application by hooking a function call that causes the application to execute.

12. The system of claim 8, wherein the program code further comprises an operation detector configured to detect a file access operation with respect to a file of a mounted file system of the container,
   wherein the signature validator is further configured to determine whether the file is signed with a valid block device signature, and
   wherein the monitor is further configured to:
      in response to a determination that the file is not signed with a valid block device signature, prevent the file access operation from being performed; and
      in response to a determination that the file is signed with a valid block device signature, enable the file access operation to be completed.

13. The system of claim 8, wherein the operation detector is configured to detect the file access operation by hooking a function call configured to open the file.

14. The system of claim 8, wherein the program code further comprises:
   a policy enforcer configured to enable the application to execute while enabling an audit mode of the integrity policy in which policy violations caused via execution of the application are detected but enforcement of the integrity policy is disabled; and
   an operation analyzer configured to:
      analyze operations of the application that caused the detected policy violations to determine whether such operations are legitimate;
      in response to a determination that the operations are legitimate:
         update the integrity policy to support the operations that caused the detected policy violations, thereby causing such operations to be no longer considered policy violations; and
         disable the audit mode; and
      in response to a determination that the operations are illegitimate, maintain the integrity policy.

15. A computer-readable storage medium having program instructions recorded thereon that, when executed by at least one processor of a computing device, perform a method, the method comprising:
   determining whether a block device signature is associated with a container that packages an application and dependencies that enable the application to execute, the block device signature also associated with the application and the dependencies as a result of being associated with the container;
   in response to determining that the block device signature is associated with the container:
      determining whether the block device signature is valid;
      in response to determining that the block device signature is valid, monitoring initiation of execution of the application and file access operations performed by the application for compliance with the integrity policy; and
      in response to determining that the block device signature is invalid, preventing execution of the application; and
   in response to determining that a block device signature is not associated with the container, preventing execution of the application of the container.

16. The computer-readable storage medium of claim 15, wherein said determining whether a block device signature is associated with a container comprises:
   determining whether a mounted file system of the container that is utilized by the application is signed with the block device signature;
   in response to determining that the mounted file system is not signed with the block device signature, unmounting the file system, thereby preventing execution of the application; and
   in response to determining that the mounted file system is signed with the block device signature and that the block device signature is valid, monitoring initiation of execution of the application and file access operations performed by the application for compliance with the integrity policy.

17. The computer-readable storage medium of claim 15, wherein said monitoring comprises:
   detecting initiation of execution of the application;
   determining whether the application is signed with a valid block device signature;
   in response to determining that the application is not signed with a valid block device signature, preventing execution of the application; and
   in response to determining that the application is signed with a valid block device signature, enabling execution of the application.

18. The computer-readable storage medium of claim 15, wherein said detecting comprises:
   hooking a function call that causes the application to execute.

19. The computer-readable storage medium of claim 15, wherein said monitoring comprises:
   detecting a file access operation with respect to a file of a mounted file system of the container;
   determining whether the file is signed with a valid block device signature;
   in response to determining that the file is not signed with a valid block device signature, preventing the file access operation from being performed; and
   in response to determining that the file is signed with a valid block device signature, enabling the file access operation to be completed.

20. The computer-readable storage medium of claim 15, wherein said detecting comprises:
   hooking a function call configured to open the file.

* * * * *